2,851,376

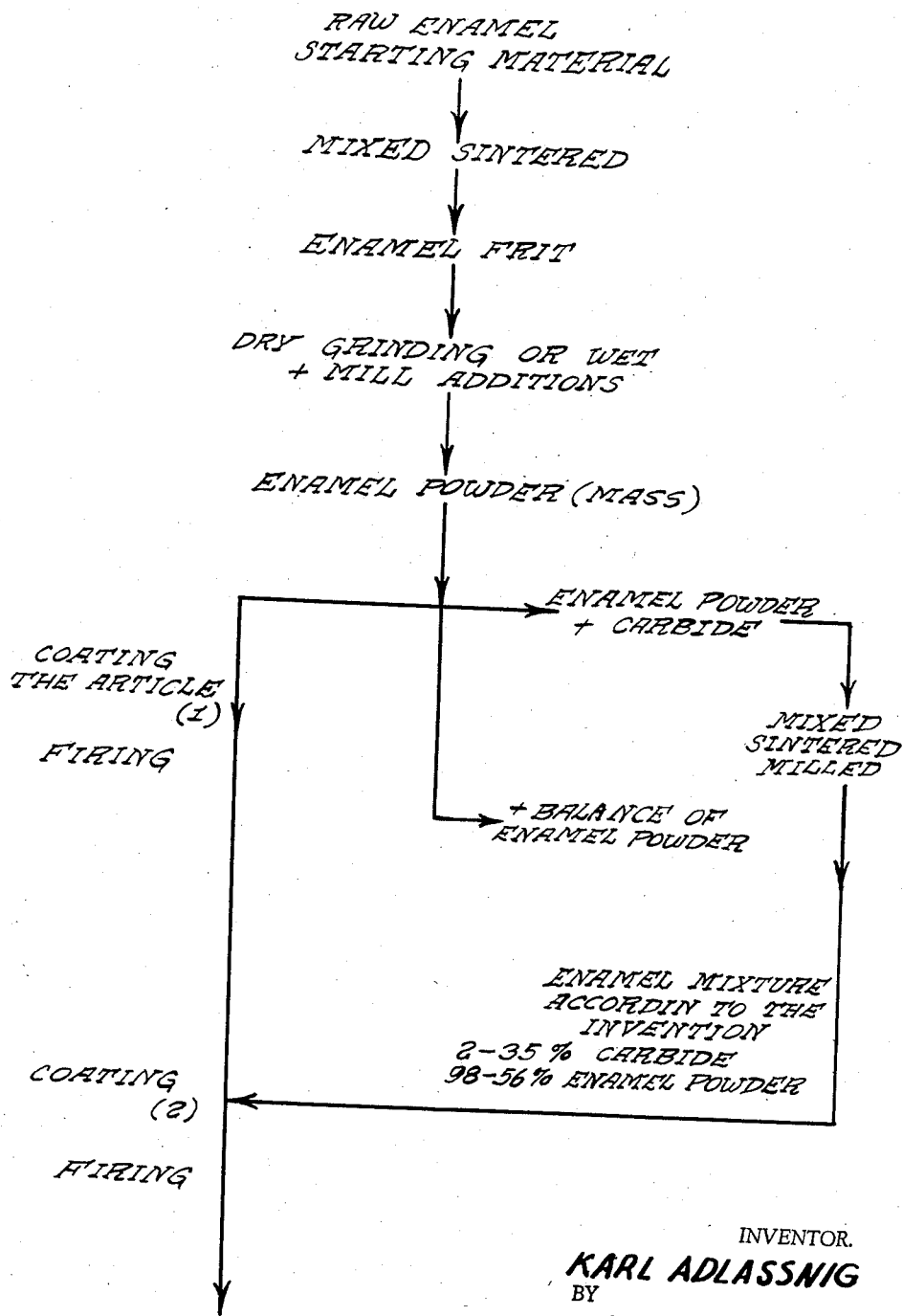

ENAMELLING PROCESS

Karl Adlassnig, Kempten (Allgau), Germany, assignor to Eisenwerke Kaiserslautern, Kaiserslautern (Pfalz), Germany Application April 25, 1956, Serial No. 580,473

7 Claims. (Cl. 117—70)

My invention relates to porcelain or ceramic enamels and is directed particularly to a method for producing vitreous enamel coatings having especially high impact resistance and improved resistance against temperature changes. The enamelling process according to my invention is particularly suitable for use in the manufacture of apparatus used in the chemical industry, for example, where high resistance against mechanical and thermal stresses, as well as resistance to chemical attack, is essential.

While in general vitreous enamelled apparatus and parts as heretofore produced exhibit high resistance against chemical attack, the resistance of such coatings against mechanical and thermal stresses is inadequate for many applications. A suitable enamel composition for overcoming these deficiencies has not heretofore been developed. Though it is known, for example, that brittleness in porcelain enamels can be minimized by the addition of a greater amount of boric acid to the composition, a sharp reduction in resistance against chemical attack results. It is also known to add silicon, silicides of the heavy metals or silicon carbide to the basic enamelling material in order to produce a homogeneous, tightly adhering covering layer having good heat conducting capacity and increased resistance against mechanical stress. Another known expedient consists in the addition of quartz glass to the basic enamelling powder to improve resistance against temperature changes.

It is the principal object of my invention to provide a novel vitreous enamelling process resulting in a coating wherein the resistance against mechanical and thermal stresses is greatly increased without at the same time lessening resistance against chemical attack. According to my invention the basic enamelling powder usually employed, before being applied to the base metal, is intimately mixed with an additive substance having a very high melting temperature and which is insoluble in the molten enamel and therefore wettable only with difficulty, the additive substance being of such a quantity and so finely divided that upon firing, melting of the enamelling powder particles into a homogeneous glass-like layer is prevented by the intermixed finely divided additive particles. Instead a polyamorphous layer having many phase boundary surfaces within the enamel layer results. The additive substance is thus mixed with the base enamelling powder in such a quantity that upon firing, melting of the enamel particles into a homogeneous glass-like layer is prevented by the finely divided additive particles, and an inhomogeneous layer having a structure similar to that existing in sintered materials is produced. The quantity of the additive substance can vary between 2 and 35 percent, depending upon the characteristics of the particular additive material used. Preferably however, the additive material is used only in an amount from 2 to 15 percent. A single additive or a mixture of two or more additives can be used. If two or more additives are used, their choice naturally should be such that their individual characteristics are not detrimentally affected through inter-reaction.

According to the invention, preferably used as additive substances are carbides, borides, silicides, or nitrides of the transition metals of the fourth, fifth and sixth groups of the periodic system, namely, titanium (Tr), zirconium (Zr), chromium (Cr), vanadium (V), molybdenum (Mo), and tungsten (W). Besides these materials, the carbides of boron (B) and silicon (Si) can be used with especially good effect. While the composition of the base metal to be enamelled need not be changed, changing the composition of the covering enamel from those of the prior art in accordance with the invention results in an enamel layer exhibiting a considerably greater elasticity and having also increased resistance to cracking. The production of the improved enamel layer on the base metal is effected simply by intimately mixing the ordinarily used pulverized enamelling material with the finely divided additive substances according to the invention, then applying the enamelling mixture upon the base metal either dry or wet in the usual manner, and finally firing the base metal.

The effects of the firing process differ considerably from those occurring in the firing of the enamels heretofore processed. While in prior art processes the individual enamel particles fuse into a homogeneous glass-like layer after softening, in which the basic enamelling particles and gas bubbles are equally alloyed, an entirely different structural composition of the enamelled layer results in accordance with the process of the invention in that the additive used, because of its characteristics as described above and because of being so finely divided, greatly hinders flowing together of the individual enamelling particles, thereby forming a homogeneous glass-like layer.

The enamel layer produced according to the invention thus exhibits a different kind of structural composition from ordinary porcelain or vitreous enamel coatings in that the individual enamel particles are not rigidly interbonded. As a result, the progression of cracks is inhibited because of the phase boundary surfaces thus existing. In contradistinction to ordinary glass-like vitreous enamels wherein the homogeneous structure offers no resistance against the progression or extension of fissures and cracks, in the enamel layer produced according to the invention there is a change in physical structure from granule to granule which serves to check cracking. The enamel according to the invention thus has a structure which differs from the usual enamel layer structure much the same as crystalline materials of polycrystalline form differ from single crystals. This different structure of a glassy, i. e., typically amorphous material, similar to the known metal-ceramic compositions, can for this reason be described as being polyamorphous to differentiate from those of simple amorphous appearance as in the usual glassy or vitreous enamel coatings.

It has further been determined that besides the additive material according to the invention having poor solubility in the enamelling mass during firing due to its poor wettability, it is also highly desirable that the additive material surrounds the absorbed gas blisters upon firing whereby an additional irregular interbreaking of the phase boundary surfaces of the vitreous enamel will result. To this end the additive materials, or at least one of them, preferably is reduced to a granular size at least ten times smaller than the size of the basic enamel granules.

Besides the newly discovered additive materials according to the invention, under certain conditions it may be advantageous also to add barium sulfate, zirconium silicate and powdered quartz in an amount of 5 to 15 percent with respect to the basic enamel material.

An especially uniform and favorable division of the materials can be had by first intimately mixing the additive or additives with only a portion of the basic enamelling powder, for instance in a proportion of one to one, and then firing this mixture at a temperature somewhat above the softening temperature of the enamel. This can be accomplished simply by piling the mixture to a height of one to two centimeters upon a heat resistant plate and placing the plate in an enamelling oven for one to two hours. The cohered mass which results can easily be broken up, and after pulverization by grinding can be mixed with such a quantity of basic enamelling powder that the additive materials exist within the above-mentioned limits of from 2 to 15 percent. This process, which corresponds to alloying processes in metallurgy, is of special advantage in cases in which the enamelling material, upon firing, results in undesired side reactions such as clouding or the production of gas bubbles. Through pre-sintering, these undesired side reactions are obviated.

In many cases it may be advantageous to provide an enamel coating consisting of a layer of ordinary enamel and a layer of enamel produced in accordance with the invention above one another. Preferably, such layers are alternately applied, one above the other, the procedure being as usual in the enamelling art, each layer being individually applied and fired.

The process herein described is suitable for all kinds of enamelling as long as the additive materials present no undesired side reactions. The usual techniques of applying and firing the enamel layers can be employed. While the enamelling produced according to the invention is fundamentally different from vitreous enamel coatings heretofore known with respect to structure and technical qualities, is coloring, darkening or the production of a harder surface can be similarly effected as before. The addition of barium sulfate, zirconium silicate and silicon carbide to enamels for darkening purposes is known. The use of barium sulfate as raw material for enamelling has of course, as is well known, been given up for a long time. The mode of operation of the above-named additive materials according to the invention, and also others, which are insoluble in the molten enamel and for that reason are wettable with difficulty and added in such a quantity that the melting of the enamel particles into a homogeneous glass-like layer is prevented and an inhomogeneous polyamorphous sinter layer similar to the structure of sintered material is produced, was unknown both with respect to its execution and with respect to the resulting characteristics. While in general, the characteristics of enamels produced in accordance with the invention are those of the usual enamel coatings heretofore produced, they are superior in that their mechanical and thermal resistance is very considerably increased.

It has been determined experimentally that enamel layers according to the process of the invention have an elasticity of about two to three times greater than that of enamels produced in the same way but without the additives of the invention. They thereby exhibit an extraordinarily high resistance against temperature changes and mechanically produced stresses. Moreover, they are highly resistant against cracking or fissuring. Even very great impact stresses which result in a more or less heavy damage of the enamel outer surface do not result in cracks extending through to the base metal. Even at the zone of impact, the undamaged remaining part of the enamel layer provides a crack-free and liquid-proof covering so that the base metal remains fully protected.

The test comparisons presented in the following are given as evidence of the desirable technical characteristics of the novel enamel produced according to the invention.

Similarly enamelled test members with ordinary enamel coatings and enamel coatings produced according to the invention were examined. In each case the same basic enamelling materials were used. The basic enamelling material used for the test members was comprised of known constituents.

A typical acid-resistant enamelling material of the following composition was used as the basic enamelling powder:

| | Percent by weight |
|---|---|
| $SiO_2$ | 65 |
| Alkali oxide | 22.2 |
| CaO | 7 |
| ZrO | 2 |
| $Al_2O_3$ | 3.8 |
| | 100.0 |

The melted enamel mass was ground and sifted. The test member enamelled according to the invention was produced by adding an additive of 8% by weight of silicon carbide to the above-mentioned basic enamelling mass. The test members in each instance were made with usual basic enamels. Then the covering enamel layers were applied either with or without the additive according to the invention.

Tests of the resistance to impact and temperature changes gave the following results:

*Tests with respect to impact resistance*

Horizontally arranged inflexible enamelled plates with the enamel layer on the upper surface were used in the tests. By means of letting a steel ball fall from increasing heights, the maximum height was determined at which the impact zone still remained undamaged. The impact resistance, derived from the product of the weight of the steel ball in kilograms and the height of the fall in centimeters, resulted in the following averages: about 24 cm. kg. with enamels produced according to the invention and about 6 cm. kg. with ordinary enamels. Especially at the higher fall distances, naturally, damage was done at the zone of impact, yet the damage was limited to the outermost surface of the enamel layer and the enamel coating remained fully secure electrically.

*Tests with respect to resistance to temperature changes*

As test members, shells enamelled on the inside and having an enamelled surface area of about 250 square centimeters were used.

These test shells were first heated to 113° C. and then quenched in a cold water bath of 13° C. These same shells were then heated to 163° C., again quenched and this procedure repeated at an increased temperature of 50° C. each time until the electrical insulating quality of the enamelled layer was affected.

The results of resistance to temperature change tests, determined by the maximum permissible quenching temperature (difference in degrees centigrade between the temperature of the shell and the temperature of the cold water bath) at which the electrical integrity of the whole enamel coating remained secure, is as follows: a maximum quenching temperature of about 350° C. with enamels according to the invention and about 200° C. with ordinary enamels. While the ordinary test enamel strongly exhibited scale-formed outer surface cracks before it became electrically insecure, in enamels produced according to the invention no changes in the outer surface were observed even at the end of the quenching operations.

From the foregoing tests it will be apparent that the enamelling process according to the invention exhibits higher resistance both with respect to impact strength and temperature variation, while having the same chemical resistance as heretofore known enamels, and is therefore adaptable for rough usage in instances where ordinary enamels as heretofore produced would be unsuitable.

The annexed drawing illustrates diagrammatically the manufacturing process according to the present invention.

It will be understood by those skilled in the art that the invention permits of various embodiments, modifica-

What I claim is:

1. The process of producing vitreous enamel layers having high resistance to mechanical stress and temperature changes, which comprises intimately mixing with a vitreous enamel to be applied, a finely divided additive substance, being chemically resistant, having a high melting point, being insoluble in and therefore poorly wettable by molten enamel, said additive being selected from the group consisting of the carbides of boron, silicon, titanium, zirconium, vanadium, chromium, molybdenum and tungsten, said additive substance being mixed with said vitreous enamel in a quantity between 2 and 35 percent by weight with respect to said vitreous enamel, firing the mixture at a temperature above its softening temperature so that it forms a coherent mass, finely dividing said coherent mass after cooling, thus forming an enamelling mixture, coating a base structure with the enamelling mixture and fusing it to form a layer of enamel, whereby a polyamorphous enamel layer having many phase boundary surfaces results.

2. The process according to claim 1, wherein in addition to said additive substance, said finely divided mass is admixed with ground quartz prior to the coating on the base structure, said ground quartz being added in an amount between 5 and 15 percent by weight with respect to said vitreous enamel.

3. The process according to claim 1, which comprises first mixing said additive substance with only a portion of said vitreous enamel in a proportion of one to one, firing said mixture to a temperature above its softening temperature to form a coherent mass, finely dividing said coherent mass after cooling, mixing said finely divided mass with the other portion of the vitreous enamel, thus forming an enamelling mixture, coating a base structure with said enamelling mixture and finally fusing said coating to form said polyamorphous enamel layer.

4. The process according to claim 1, wherein at least a part of said additive substance is finely divided into particles of a size at least one-tenth as small as the particle size of said vitreous enamel.

5. The enamelling process according to claim 1, comprising coating the surface of a base structure with a basic layer of vitreous fused enamel, then coating said base structure with said enamelling mixture and fusing said basic layer with said enamelling mixture by firing, to form a composite layer of enamelling.

6. The process of forming a composite layer having high resistance to mechanical stress and temperature changes, which comprises alternately fusing on the base structure to be coated, enamel layers of vitreous enamelling material and enamel layers of enamelling mixtures compounded according to the process of claim 1, comprising first applying to an article to be coated of vitreous enamel, next applying said mixture compounded according to the process of claim 1, further applying vitreous enamel mixture, and finally applying said mixture compounded according to claim 1.

7. The process of producing vitreous enamel layers having high resistance to mechanical stress and temperature changes, which comprises intimately mixing with a vitreous enamel to be applied to an article, one or more finaly divided additive substances, being chemically resistant, having a high melting point, being insoluble in and therefore poorly wettable by molten enamel, selected from the group of hard materials consisting of the carbides of boron and silicon, and of the carbides, silicides, borides and nitrides of titanium, zirconium, vanadium, chromium, molybdenum and tungsten, said additive substances being mixed with said vitreous enamel to be applied in a quantity between 2 and 35 percent by weight with respect to said vitreous enamel, firing the mixture at a temperature above its softening temperature so that it forms a coherent mass, finely dividing said coherent mass after cooling, thus forming an enamelling mixture, coating a base structure with the enamelling mixture and fusing it to form a layer of enamelling, whereby a polyamorphous enamel layer having many phase boundary surfaces results.

References Cited in the file of this patent

UNITED STATES PATENTS

| 2,311,039 | Emery | Feb. 16, 1943 |
| 2,756,168 | Barnett | July 24, 1956 |

FOREIGN PATENTS

| 157,504 | Australia | July 7, 1954 |